United States Patent [19]

Runkvist et al.

[11] Patent Number: 4,862,696

[45] Date of Patent: Sep. 5, 1989

[54] APPARATUS FOR DOSAGE OF A CONDENSED GAS

[75] Inventors: Birger Runkvist, Gökvägen; Lars Lindgren, Larsbergsvägen; Sabud Axelsson, Markvägen, all of Sweden

[73] Assignee: AGA-AB, Lidingo, Sweden

[21] Appl. No.: 312,431

[22] Filed: Feb. 17, 1989

Related U.S. Application Data

[63] Continuation of Ser. No. 191,816, May 3, 1988, abandoned, which is a continuation of Ser. No. 71,444, Jul. 9, 1987, abandoned.

[30] Foreign Application Priority Data

Jul. 21, 1986 [SE] Sweden ................... 8603171

[51] Int. Cl.$^4$ .............................................. F17C 7/02
[52] U.S. Cl. ....................................... 62/50.6; 141/67; 417/511
[58] Field of Search ............... 62/55; 417/511; 141/67

[56] References Cited

U.S. PATENT DOCUMENTS

| | | | |
|---|---|---|---|
| 2,500,320 | 3/1950 | Peff | 62/53 |
| 2,978,336 | 4/1961 | Morrison | 99/192 |
| 3,809,508 | 5/1974 | Uchiyama | 417/511 |
| 3,930,756 | 1/1976 | Bruggeman | 417/511 |
| 4,059,424 | 11/1977 | Bentz | 62/49 |
| 4,192,147 | 3/1980 | Gilbert et al. | 62/49 |
| 4,203,299 | 5/1980 | Dinglinger | 62/49 |
| 4,296,610 | 10/1981 | Davis | 62/55 |
| 4,407,340 | 10/1983 | Jensen et al. | 141/67 |
| 4,471,627 | 9/1984 | Hongo et al. | 62/49 |
| 4,472,946 | 9/1984 | Zwick | 62/55 |
| 4,489,767 | 12/1984 | Yamada | 141/48 |
| 4,490,984 | 1/1985 | Hongo et al. | 62/49 |
| 4,497,178 | 2/1985 | Hongo et al. | 62/55 |
| 4,499,931 | 2/1985 | Urban | 141/67 |
| 4,506,512 | 3/1985 | DeLacour et al. | 62/55 |
| 4,546,609 | 10/1985 | Roullet et al. | 62/49 |
| 4,583,346 | 4/1986 | Kameda | 53/431 |
| 4,588,000 | 5/1986 | Malin et al. | 141/1 |
| 4,592,205 | 6/1986 | Brodbeck et al. | 62/49 |
| 4,662,154 | 5/1987 | Hayward | 53/431 |

FOREIGN PATENT DOCUMENTS

| | | |
|---|---|---|
| 2732318 | 1/1979 | Fed. Rep. of Germany . |
| 371010 | 11/1974 | Sweden . |
| 409356 | 8/1979 | Sweden . |
| 1455652 | 11/1976 | United Kingdom . |
| 2091228 | 7/1982 | United Kingdom . |

*Primary Examiner*—Ronald C. Capossela
*Attorney, Agent, or Firm*—Calfee, Halter & Griswold

[57] ABSTRACT

An apparatus for a dosage of minor amounts of condensed gas includes a container (2) connected to a source of liquid gas by an inlet conduit (5). The container is thermally insulated (3) and disposed in a surrounding jacket (6). Apparatus includes a device (17) for maintaining a predetermined liquid level in container (2) and a dosage pump (4). The dosage pump (4) is disposed in container (2) below the predetermined liquid level (10).

8 Claims, 2 Drawing Sheets

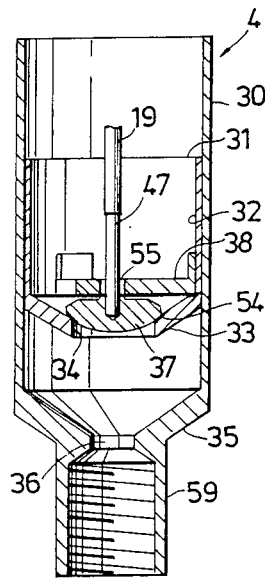
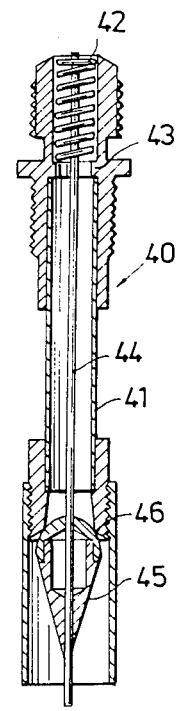
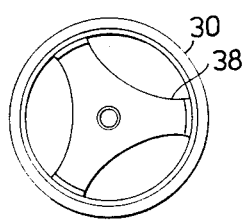

APPARATUS FOR DOSAGE OF A CONDENSED GAS

This is a continuation of co-pending application Ser. No. 191,816, filed May 3, 1988, now abandoned, which is a continuation of application Ser. No. 071,444, filed July 9, 1987, now abandoned.

BACKGROUND OF THE INVENTION

The present invention relates to an apparatus for discharging predetermined amounts of liquid gas, preferably liquid nitrogen or other low-boiling point condensed inert gas, for the inertion and/or pressuring of containers, bottles, cans, or the like. The apparatus comprises a container which is connected through an inlet conduit to a source of condensed gas, is thermally insulated, and is disposed in a surrounding casing. The apparatus further includes means for maintaining a predetermined liquid level in the container and a dosage pump.

In the dosage of minor amounts of a low-boiling point, condensed gas the primary object is to supply the correct amount of gas to each container and to minimize or avoid losses of condensed gas; for example, the gas which falls outside the container when continuous flow is employed.

An apparatus for the dosage of liquid nitrogen is previously known in the art from DE-OS 27 32 318 in which a disc which is pivoted about a vertical axis is rotated beneath the outlet aperture for the nitrogen. Depending upon the configuration of the disc, the discharge aperture will be closed during a greater or lesser period of time.

It is further known from GB-A-2 091 228 to control the dosage of a low-boiling point, liquid gas by means of a needle valve which constitutes the outlet aperture of the dosage apparatus. In this prior art construction the valve needle is drawn upwardly by a solenoid so that liquid nitrogen may depart from the container of the dosage apparatus. This prior art apparatus suffers from the drawback that ice crystals may be formed at the valve seat during its operation, which may lead to irregular flow through the valve.

SUMMARY OF THE INVENTION

The object of the present invention is to provide a simple and operationally reliable apparatus which doses exact amounts of condensed gas to each receptacle vessel. A further object is that all such dosed liquid come to rest in the vessel so that consumption of condensed gas may be kept to a minimum.

These and other objects will be attained in the apparatus, according to the present invention, having a dosage pump disposed in the container, or at least partly in the container, with the insulation surrounding the container below a predetermined liquid level.

BRIEF DESCRIPTION OF THE ACCOMPANYING DRAWINGS

The nature of the present invention and its aspects will be more readily understood from the following brief description of the accompanying drawings, and discussion of one embodiment of the present invention relating thereto in which:

FIG. 2 is a vertical schematic section of one preferred embodiment of a dosage pump.

FIG. 3 is a schematic top plan view of the pump of FIG. 2.

FIG. 4 is a schematic vertical section of the outlet of the pump of FIG. 2 with one preferred embodiment of a non-return valve.

DESCRIPTION OF THE PREFERRED EMBODIMENT

Figure 1:
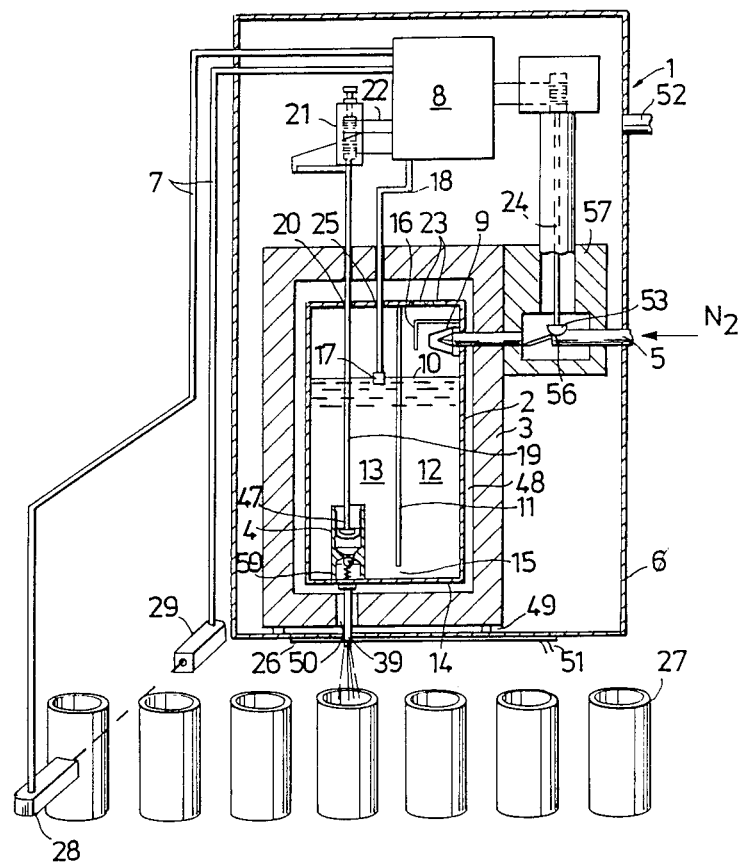
FIG. 1 is a schematic vertical section of the apparatus according to the present invention and containers to which doses of liquid gas are supplied.

Referring to the drawings, apparatus (1) illustrated in FIG. 1 comprises a liquid container (2) for condensed gas of low-boiling point, for instance, liquid nitrogen. Container (2) is surrounded by an insulating casing (3). Container (2) and casing (3) are located in jacket (6) of apparatus (1) which is continually supplied with inert gas so as to exclude the more or less humid ambient atmosphere.

A source (not shown) of condensed gas is connected by a conduit (5) to container (2). Conduit (5) is fitted with a solenoid valve (24) which is disposed within jacket (6). At least valve body (53) and valve seat (56) of valve (24) are enclosed by a thermally insulating covering (57) which may be of one-piece construction integral with casing (3), or be of a separate design. Opening of valve (24) is controlled by a level sensor (17) with the assistance of a governor (8).

A sintered filter body (9) is connected to the outlet aperture of conduit (5) in the container, the filter body separating the gas phase from the liquid phase with which it is entrained. A baffle (11) or wash plate divides the container into two chambers (12) and (13). Baffle (11) is fixedly retained in the top and sides of the container and its lowermost edge is spaced apart from the bottom (14) of container (2) so that chambers (12) and (13) are in liquid communication with one another through a gap (15) between bottom (14) of container (2) and the lowermost edge of the baffle. The height or width of this gap is less than a predetermined liquid level (10) in container (2). A splash guard (16) is disposed in chamber (12) in which conduit (5) discharges. This splash guard is arranged upstream of filter body (9), seen in the direction of flow of the liquid through conduit (5).

In chamber (12) the top of container (2) is provided with apertures (23), and in chamber (13) with apertures (20), (25) through which vaporized liquid may depart from container (2).

Baffle (11) may also be split, in which instance the upper region is fixedly retained in the top and sides of the container while its lower region, which may be bevelled at its bottom towards the generatrix of the container in order to establish communication between chambers (12) and (13), is fixedly anchored along two diametrically disposed generatrices in the lower container region. The lowermost end edge of baffle (11) may be disposed at a distance from the bottom (14) of container (2) so that chambers (12) and (13) will be in liquid communication with one another also in this embodiment through a gap (15) between the bottom (14) of container (2) and the lowermost end edge of the baffle. In this embodiment liquid level (10) is below the upper edge of the lower container region. Gas phase contents may depart from the container between the container sections.

According to one preferred embodiment, container (2) is spaced apart from insulation (3) and is held in place by spacers (not shown). In this situation, a substantially shell-like cavity (48) is formed between container (2) and casing (3).

According to one embodiment (not shown), container (2) is an upright cylinder and is solely in contact with insulation casing (3), which is of quadratic cross-section at right angles to the axis of the cylinder, by the contact of four generatrices with insulation (3), or at a distance from insulation (3), being then held in place by spacers.

A dosage pump (4) is fixedly disposed in the bottom of container (2) in chamber (13). A non-return valve (40) is disposed in the outlet of pump (4) and, following valve (40), an outlet conduit (39) is connected to the housing of pump (4). Outlet conduit (39) extends from pump to an aperture (5) in the insulating casing and jacket (6) of the apparatus.

Casing (3) may stand on the bottom of jacket (6) or be spaced apart from the bottom of the jacket by means of spacers (not shown).

A power transmission member (19) connected to pump (4) passes through an aperture (20) of larger cross-sectional area than member (19) and through a corresponding aperture in casing (3). That end of power transmission member (19) located outside casing (3) is inserted in a solenoid device (21) which is connected by conduit (22) to governor (8). Furthermore, a level sensor (17) is disposed in chamber (13) of container (2) and is connected by conduit (18) to governor (8) in jacket (6) of apparatus (1). The level sensor maintains a liquid level (10) in container (2) within predetermined limits when the apparatus is in operation.

On its underside, the bottom of apparatus (1) is provided with an electric heating plate (26) which is connectable to a source of electric power by leads (51). Heating plate (26) is provided with an opening coaxial with aperture (50), through which outlet conduit (39) of the pump is passed.

Pump (4), schematically illustrated in cross-section in FIG. 2, comprises a cylindrical housing (30) in which a piston (32) is movable in the axial direction. Housing (30) has a bottom (35) which tapers conically, the apex of the cone having an outlet aperture (36). An outlet pipe socket (59) is disposed beneath the bottom (35). The socket is internally threaded.

Piston (31), movable along the inner surface of cylindrical housing (30), includes a casing (32) resting against the inner surface of housing (30) and provided at its lower end in a conically tapering bottom (33) which is of the same conical angle as the bottom (35) of housing (30). Each respective bottom (33) and (35) of piston (31) and housing (30) may also be flat. An aperture (34) is disposed in the apex of the bottom of piston (31). On the inside of casing (32) of piston (31) there is disposed a spider (38) with a central aperture (55) through which a valve spindle (47) is passed. In the present case spider (38) is flat and is anchored at three points in casing (32). FIG. 3 is a top plan view of the spider. The underside of spider (38) is flush with the conical bottom (33) of piston (31) at piston casing (32), but may, naturally, be disposed at a more elevated position. On its outside, casing (32) of piston (31) may be provided with a helical groove throughout the entire circumferential surface of the casing in order to reduce friction between piston (31) and housing (30).

The upper end of valve spindle (47) merges into power transmission member (19) and is provided at its lower end with a valve body (37) which, in its lowermost position, rests against the bottom (33) of piston (31), the inner or upper boundary surface (54) of aperture (34) forming a valve seat for valve body (37). In such instance, the upper end of valve body (37) is located a distance from spider (38). During downward movement of valve spindle (47), the valve body will first enter into abutment with valve seat (54), if it is not already in abutment therewith, and thereafter, valve spindle (47) will, while the movement continues, displace piston (31) downward by valve body (37). When the direction of movement of valve spindle (47) is subsequently reversed, the spindle will first raise valve body (37) until such time as its upper surface comes into contact with spider (38), in which event piston valve (37), (54) is opened and valve spindle (47) will subsequently raise piston (31) by means of valve body (37) and spider (38). The underside of valve body (37) facing seat (54) is of, for example, conical, spherical, or rotational ellipsoidal curvature. The distance between spider (38) and the upper surface of the valve body when the valve is closed, i.e., when the valve body abuts against seat (54), may be varied by different means.

Beneath the bottom (35) of housing (30) pump (4) is provided with an outlet socket (59) in which a non-return valve is preferably disposed. One embodiment is illustrated in FIG. 1 in which the non-return valve comprises a valve body abutting against the underside of the opening and resting on a spring. The spring urges the valve body towards the opening, which forms a seat for the valve body, with a force which exceeds the liquid pressure acting on the valve body when the valve body is at rest or is in upward motion.

A further embodiment of non-return valve (40) is apparent from FIG. 4 and includes a tubular element (41) with a helical spring (42) in the upper section of element (41). Spring (42) rests on an annular shoulder (43) and a valve rod (44) is fixedly retained in the upper end of spring (42). A valve body (45) is disposed at the lower end of valve rod (44). To reduce the weight of the valve body, it is of hollow construction. On its upper phase valve body (45) abuts, in the deactivated position, against a seat (46). The design of spring (42) is such that it is not compressed until the pressure of the liquid acting on valve body (45) overcomes the hydraulic pressure acting on the body when the valve body is at rest or is in upward motion.

When container (2) is empty and apparatus (1) is to be filled with liquid gas, the liquid gas is caused to flow through conduit (5), valve (24) being opened. In filter body (9), gas vapors are separated from liquid, the liquid falling towards the bottom of the container and gas vapors flowing past splash guard (16) and departing from container (2) through apertures (23) in chamber (12). Thereafter, the vapors dissipate in the shell-like cavity (48) and depart then through aperture (50), the cold vapors cooling outlet conduit (39) and through apertures in casing (3) through which power transmission member (19) and conduit (18) pass. The gases emitting through these latter apertures dissipate in apparatus casing (6) and depart thence through, for example, aperture (50) through gap (49) and other apertures (not shown). Liquid vaporized in chamber (13) departs from the chamber through apertures (20) and (25) and unites with gas from apertures (23). Continuous supply of gaseous nitrogen is effected through aperture (52) and by means of the vaporization process in container (2), a certain excess pressure being generated in jacket (6) in relation to the ambient atmosphere. As a result, no humid air can penetrate into the jacket.

When container (2) is cooled, it is more rapidly filled with liquid nitrogen. After the liquid in the container has attained the predetermined level, the dosage operation may be properly commenced. When valve spindle (47) begins to lift, under the action of drive means (21) and by the intermediary of power transmission member (19), valve body (37) leaves its seat (54) and soon comes into contact with the underside of spider (38). As a result, an annular gap is formed between valve body (37) and seat (54) through which liquid which is located in and above piston (42), may flow downward to outlet (36) of the pump. After valve body (37) has come into contact with spider (38), the entire piston (32) is raised. When valve spindle (47) has been raised the predetermined distance, its movement is reversed, valve body (37) then moves downward, while the piston as a whole is not at first actuated. After valve body (37) has come into contact with its seat (54), the valve is once again closed and piston (32) accompanies valve body (37) in its downward motion and urges the liquid located between the bottom of the piston and the bottom (35) of the pump cylinder out through outlet (36).

As piston (32) is urged downward, the pressure acting on valve body (35) increases beyond a predetermined level, as a result of which spring (42) is compressed and rod (44) with valve body (45) are moved downward. An annular gap between valve body (45) and its seat (46) is formed, through which the liquid may flow and depart from the outlet. Then piston (42) has reached its lowermost position, the pressure on valve body (46) falls to a low level and valve body (45) reassumes, as a result, the closed position illustrated in FIG. 4.

From its lowermost position, piston (32) commences a new pumping sequence, valve body (37) and rod (19) first initiating an upward movement, and once valve body (37) has come into contact with spider (38), the entire piston (32) is raised.

The volume dosed per cycle of the pump may be controlled by modifying the lifting height of piston (32) from the bottom of pump cylinder (35). By modifying the play between spider (38) and valve body (37), the amount of liquid per unit of time flowing into the cavity between piston (32) and the bottom (35) of the pump cylinder may be modified.

Other embodiments of pump (4) are also conceivable. For instance, pump housing (30) may be extended at its end facing away from the outlet. In this instance, the inlet will not consist of the entire inner cross-section of cylindrical pump housing (30), but of one or more apertures in the wall of pump housing (30) above the uppermost position of piston (31). As a result, pump housing (30) may extend above level (10) without this influencing operation of pump (4). For the purpose of the present invention, the term pump (4) means the active section of a pump, i.e., that section of the pump in which piston (31) is movably disposed, including the inlet aperture which is located above the uppermost position of the piston.

According to one embodiment (not shown), insulation (3) may replace container (2), in which event aperture (50) will naturally abut sealingly against outlet conduit (39).

When apparatus (1) of FIG. 1 is in operation, containers, for example, aluminum cans (27), are caused to pass beneath outlet conduit (39) of container (2). These cans may be located on a conveyor belt which conveys, at equal speed, the cans beneath outlet conduit (39).

In the illustrated embodiment, a sensor (28), (29) senses when a can passes a certain point ahead of outlet (39). The signal from sensor (28), (29) is transmitted to governor (8) by leads (7), the governor controlling pump (4) such that the predetermined amount of liquid is caused to depart from outlet (39) when the can is located beneath the outlet.

When the liquid in container (2) has fallen to a predetermined minimum level, valve (24) is opened and liquid with gas bubbles flows into chamber (12). Filter body (9) separates the gaseous phase from the liquid phase. When the liquid level in container (2) has risen to a predetermined maximum level, valve (24) is closed.

The present invention should not be considered as restricted to that described above and shown on the drawings, many modifications being conceivable without departing from the spirit and scope of the appended claims.

Having thus described our invention, what we claim as new and desire to secure by Letters Patent is:

1. An apparatus for discharging predetermined amounts of condensed gas comprising:
   a container (2) connected to a source of liquid gas by an inlet conduit (5), said container being thermally-insulated and disposed in a surrounding jacket (6),
   means (17) for maintaining a predetermined liquid level (10) in said container (2),
   a dosage pump (4) located at least partially in the container and the surrounding insulation beneath the predetermined liquid level (10), said pump during operation being entirely below the liquid level,
   a drive member (21) connected to said pump (4) by a power transmission member (19),
   a governor (8) for the pump located in said jacket (6) in which there is maintained an atmosphere of the gas at a higher pressure than the pressure of the ambient atmosphere, and
   said dosage pump (4) includes a piston and a cylinder (30) wherein said piston (31) is axially movable in said cylinder (30) and the liquid inlet of said pump is disposed in said cylinder (30) above the uppermost position of said piston (31).

2. The apparatus as claimed in claim 1 wherein said power transmission member in said pump housing is connected to a valve spindle (47) which, at its free end, is fixedly connected to a valve body (37); said piston (31) includes a cylindrical casing (32) slidedly displaceable along the pump cylinder (30); a bottom (33) with a central aperture (34) whose edge facing the interior of said piston (31) forms a seat (54) for said valve body (37); and a spider (38) disposed in piston casing (32) and provided with a central aperture through which said valve spindle is passed; and said valve body (37) is movable in the axial direction between said valve seat and said spider (38) or a point between said seat (54) and said spider (38).

3. The apparatus as claimed in claim 2 wherein the outer side of said cylindrical casing of said piston is provided with a helical groove.

4. The apparatus as claimed in claim 2 wherein said pump includes in its outlet a non-return valve.

5. The apparatus as claimed in claim 4 wherein said non-return valve (40) includes a spring-loaded cone (45) and is open in the forward direction when the pressure of said cone (45) overcomes the hydraulic pressure which the liquid in container (2) exerts on cone (45) by a predetermined level.

6. The apparatus as claimed in claim 5 wherein said inlet conduit (5) discharges into said container (2) above said predetermined liquid level (10) and a sintered filter body (9) acting as a phase separator for gas and liquid is disposed in an outlet of said inlet conduit (5).

7. The apparatus as claimed in claim 5 wherein said container (2) is divided by a baffle (11) into two parts forming two chambers (12), (13); said two chambers communicate with each other by means of a gap (15) formed in-between said baffle (11) and the bottom (14) of the chambers, said gap (15) being of a lower height than the predetermined liquid level; and wherein said pump (4) and said filter body (9) are each disposed in separate chamber (13), (12).

8. The apparatus as claimed in claim 1 wherein a splash guard (16) is disposed between said filter body (9) and said baffle (11).

* * * * *